L. B. GRUMAN.
INDICATOR.
APPLICATION FILED APR. 21, 1917.
1,274,875.
Patented Aug. 6, 1918.
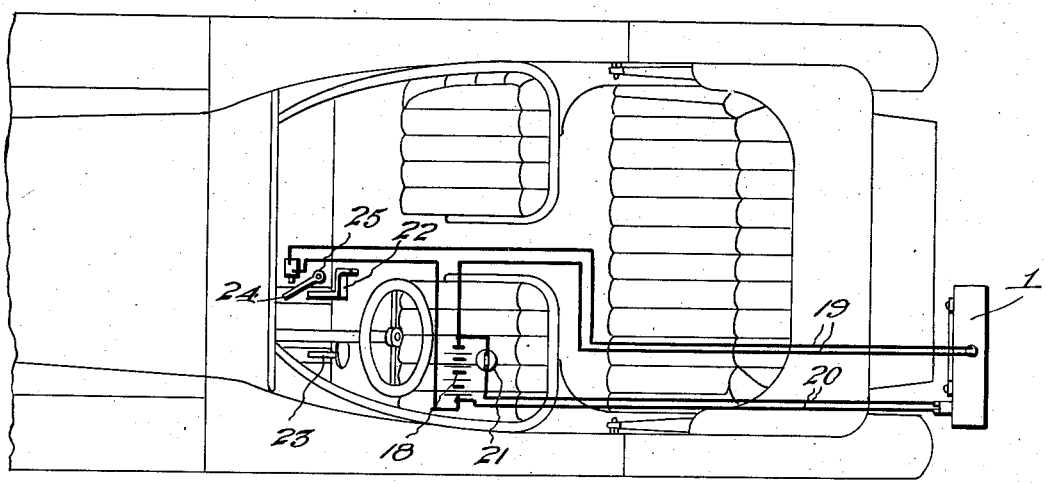
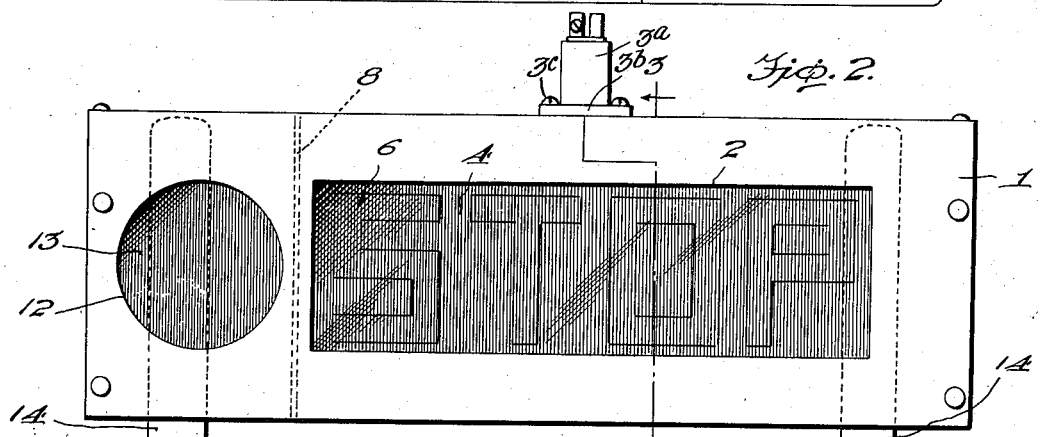
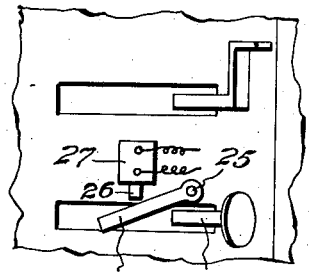
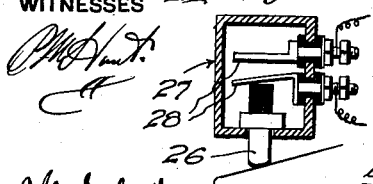
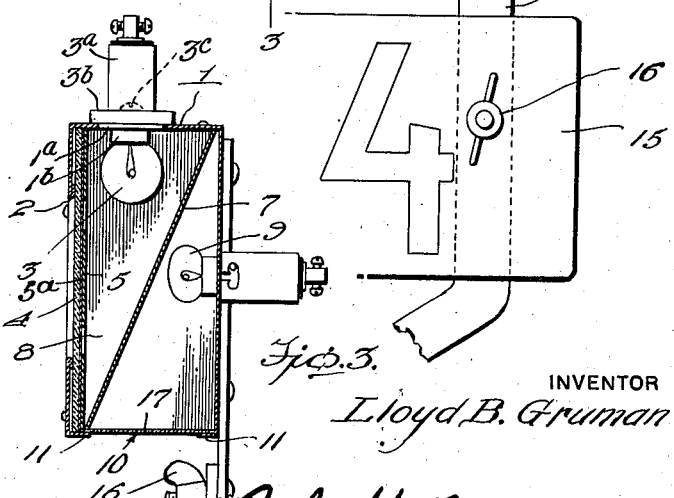
INVENTOR
Lloyd B. Gruman
WITNESSES
ATTORNEY

UNITED STATES PATENT OFFICE.

LLOYD B. GRUMAN, OF NEWARK, NEW JERSEY.

INDICATOR.

1,274,875.　　　　Specification of Letters Patent.　　Patented Aug. 6, 1918.

Application filed April 21, 1917. Serial No. 163,559.

*To all whom it may concern:*

Be it known that I, LLOYD B. GRUMAN, a citizen of the United States, residing at Newark, in the county of Essex and State of New Jersey, have invented certain new and useful Improvements in Indicators, of which the following is a specification.

My invention relates to improvements in indicators adapted more particularly for use upon automobiles, and it consists in the constructions, combinations, and arrangements herein described and claimed.

An object of my invention is to provide a danger indicator consisting of a light box adapted to be mounted upon the rear end of an automobile, the light box having a window bearing a suitable danger indicating legend which is adapted to be illuminated by an electric light upon the closure of a light circuit by the operation of the clutch pedal.

Another object of the invention is to provide a danger indicator including a light box having a window bearing a danger indicating legend which is adapted to be intermittently illuminated but simultaneously with the actuation of the clutch pedal, the aforesaid window being partitioned from the body of the box by an angularly disposed plate which serves to reflect the rays of light from a constantly illuminated and self contained tail-light upon the number plate of the automobile.

Another object of the invention is to provide a danger indicator having a window bearing a danger indicating legend which is adapted to be illuminated by an incandescent light upon the closure of the circuit of a light by the operation of an operating lever of the automobile.

Other objects and advantages will appear from the following specification reference being had to the accompanying drawing, in which:—

Figure 1 is a plan view of a portion of an automobile body illustrating the application of the indicator, the light circuit and closing means therefor being indicated diagrammatically, Fig. 2 is an elevation of the indicator box showing the constantly illuminated tail-light and the window bearing the danger indicating legend, Fig. 3 is a cross section on the line 3—3 of Fig. 2, Fig. 4 is a detail view illustrating the application of the switch through the brake pedal of the automobile, and Fig. 5 is a slightly enlarged section of the switch.

In carrying out my invention, I provide a light or signal box 1 which is preferably constructed of metal and formed into the general rectangular shape illustrated in Figs. 1 and 2. A window or opening 2 is provided in the light or signal box 1 as shown in Fig. 2.

A glass pane 4 is fitted behind the opening 2 and portions thereof are transparent to the rays of light from the incandescent lamp 3. A mask 5 which is opaque to the rays of light from the lamp 3 is placed behind the glass pane 4. The letters 6 of a danger indicating legend are cut out of the mask 5, so that when the mask is illuminated by the lighting of the lamp 3, only the portions 6 are rendered visible to a person following the automobile.

The pane 4 is preferably of red glass and a sheet of translucent material $5^a$ is interposed between the pane 4 and the mask 5. When the mask 5 is illuminated, the letters 6 will appear in red, but the provision of the translucent sheet $5^a$ will accomplish a result hereinafter more fully explained.

The rays of light from the lamp 3 are screened from the remainer of the light box 1 by a partition 7 which is disposed at an angle across the light box 1 so as to perform a dual function of a reflector for concentration or focusing of the light from the lamp 3 onto the mask 5, and also reflecting the rays of light from another lamp 9 in a downward direction for a purpose presently to be explained.

The partition 7 includes an end closure 8 which not only serves to screen the light from the lamp 3 from the end of the box 1, but also serves to assist in supporting the partition 7 in its proper position.

The bottom of the light or signal box 1 is open as at 10. Ledges 11 are formed on the longitudinal edges of the opening 10. One of the ledges 11 supports the glass pane 4, and also supports the edge of the partition plate 7 as shown in Fig. 3.

Although the partition 7 may in actual practice be made of any suitable material, it has been found that in making it of tin, a partition is provided which not only has the required flexibility or resiliency for permitting it to be sprung into position behind the glass 4, but also has the bright reflecting surfaces for the purposes before mentioned.

The light or signal box 1 has an opening 12 at the end adjacent to the closure 8, behind which a red glass 13 is placed which is adapted to be constantly illuminated at night by the incandescent lamp 9. The present embodiment of the invention as illustrated more particularly in Fig. 2, provides a combined danger indicating signal and tail-light. It will be obvious that a three-fold purpose is thus fulfilled, namely the direct illumination of the red glass 13 thus providing a tail-light, the illumination of a license plate by means of reflected light from the lamp 9, and the provision of the danger indicator.

The constantly illuminated tail-light may however be dispensed with, since in installing the indicator on automobiles which already have tail-lights, it is obvious that the tail-light embodied in the device is unnecessary. It is preferable however that the tail-light be embodied in the signal box 1 so that the advantages of the tail-light may be had in case of an emergency.

Brackets 14 are secured to the rear of the signal box 1, the brackets 14 being downwardly extended somewhat in the manner indicated in Fig. 2. The downwardly extended portions of the brackets 14 serve to support the license plate 15 which is secured to the brackets by the usual bolts and thumb screws 16. The lower portions of the brackets 14 are then bent inwardly, and although the connection of the ends of the inwardly bent brackets 14 is not shown, it is to be understood that they are to be inserted in one of the supporting brackets usually found upon an automobile, and clamped in position therein.

A clear glass pane 17 is slid across the opening 10 in the bottom of the box 1 and rests upon the ledges 11 as shown in Fig. 3. The glass pane 17 prevents the entrance of foreign matter into the interior of the box 1.

A battery 18 supplies current to the respective lamps 3 and 9. The wires 19 supply current from the battery 18 to the lamp 3 while the wires 20 supply current to the lamp 9. A switch 21 interposed in the wires 20, serves to break the circuit when it is desired to darken the tail-light 13.

The lamp 3 is illuminated intermittently and only when the clutch lever 22 or the brake lever 23 is operated. The mask 5 and the legend 6 is illuminated in the day as well as at night. In other words whenever the operating lever is operated by the foot of the chauffeur, the legend 6 is illuminated by the lamp 3.

The electric circuit through the lamp 3 is closed upon the engagement of a switch arm 24 by the clutch lever 22 in the embodiment illustrated in Fig. 1. When the clutch lever 22 is moved forwardly to disengage the clutch in the well-known manner, the switch arm 24 is engaged and moves upon its fulcrum 25 until the plunger 26 of the switch 27 causes the engagement of the contacts 28.

The switch 27 is of the conventional type and includes the normally open contacts 28 which are pressed together when the plunger 26 is moved inwardly by the rocking of the switch arm 24 on the fulcrum 25. The switch 27 is interposed in the electric circuit comprising the wires 19, and in view of the fact that the circuit is normally open at the contacts 28, it follows that the lamp 3 is normally extinguished and is lighted only when the contacts 28 are closed upon the operation of the clutch lever 22.

In Fig. 4, the switch 27 is shown in coöperation with the brake lever 23. The purpose of the showing of the switch 27 in connection with the clutch lever 22 in one instance, and the brake lever in the other, is to illustrate that the danger signal is adapted to be operated by either the clutch system or the brake system of the automobile.

The operation of the device is as follows: The signal box 1 which is mounted upon the brackets 14, is first secured in place upon the rear end of an automobile A. If the safety signal is used at night, the switch 21 is closed so that the lamp 9 is lighted. The red pane 13 of the tail-light is thus illuminated, and the rays of light from the lamp 9 in striking the diagonally disposed partition 7, are reflected downwardly by the polished surface thereof so that they strike the license plate 15 which is thus illuminated.

The lamp 3 is normally extinguished and the legend 6 is not visible because it is shielded from the light of the lamp 9 by the solid partition 7. Should the chauffeur now have occasion to apply his brakes, he first disengages the clutch of the automobile by shoving forwardly on the lever 22.

As he does this the switch arm 24 is engaged by the clutch lever 22, and the contacts 28 accordingly engaged. Current from the battery 18 then flows over the wires 19 thus lighting the lamp 3 and illuminating the letters 6 of the danger indicating legend.

When the clutch lever 22 is again moved rearwardly, the contacts 28 are moved out of engagement because of the inherent resiliency of the lower one, and thus the circuit through the wires 19 is broken and the lamp 3 is extinguished. The illumination of the legend is accordingly terminated and is no longer visible.

The legend is adapted to be illuminated whenever the clutch lever 22 is operated, both by day and by night. The tail-light 13 however is illuminated only at night, and as has been pointed out may be dispensed with as an integral unit with the signal box 1 if it is so desired. It has also been pointed out that the switch 27 may be operatively applied to the brake pedal equally as well as with the clutch lever 22.

It has been explained that a translucent sheet of material 5ª is interposed between the red pane 4 and the mask 5. It has been found in actual practice that the translucent sheet is essential to the proper appearance of the device more particularly in daytime.

The omission of the sheet 5ª and the simple omission of the vignetted mask 5 permits the revelation of the letters formed in the mask when viewed from certain angles. This is of course objectionable since it is desirable that under ordinary conditions the letters be not visible. The pane 4 of course appears red in the daytime and it has been found that by providing the translucent sheet behind the pane, the lighting of the lamp 3 causes the illumination of the sheet 5ª where it appears before the openings in the mask 5, in such a manner that the letters of the legend are peculiarly and strongly contrasted against the red back-ground of the pane.

The red color of the pane 4 is of course not discernible at night and will appear totally black. Now when the lamp 3 is lighted, the letters of the lamp will appear red as previously pointed out.

Another feature designed to contribute toward the general efficiency of the device, lies in the manner by which the lamp 3 may be removed. Under ordinary conditions the position of the lamp 3 at the top of the box 1 makes it inaccessible so that it cannot readily be replaced upon burning out. To overcome the difficulty above named, the lamp 3 is mounted in the receptacle 3ª which has the usual flange 3ᵇ.

An opening 1ª in the top of the box 1 permits the insertion of the lamp 3 carried by the receptacle 3ª, whereupon the flange 3ᵇ is secured in place by the screws 3ᶜ which also pass through the bosses 1ᵇ provided on the inside of the box for the purpose. Obviously by simply removing the screws 3ᶜ, the lamp 3 may be bodily removed and readily replaced.

While the construction and arrangement of parts as illustrated in the drawing is that of a generally preferred form, obviously modifications and changes may be made without departing from the spirit of the invention or the scope of the claims.

I claim:—

1. An indicator for an automobile including a constantly illuminated window and an intermittently illuminated window bearing a danger indicating legend, means for supporting a removable closure for the indicator, and an insertible partition-reflector for separating the rays of light from the lamps.

2. An indicator comprising a box with an open flanged bottom and having a constantly illuminated window forming a taillight, an intermittently illuminated window, a mask describing a danger indicating signal, a transparent plate forming a closure for the flanged bottom, a partition for screening the light from the constantly illuminated lamp from the legend, the partition being insertible through the open bottom and arranged to recline on one of the flanges for holding the mask in position.

3. An indicator for an automobile comprising a signal box having ledges formed on the lower portion, said box having glazed openings in its front wall, a danger indicating legend on one of said glazed openings, a normally extinguished lamp carried by said box in the rear of said danger indicating legend, the lower portion of said box being open, a glass pane carried upon said ledges for closing the opening in the lower portion of said box, a diagonally disposed partition reflector extending from the upper portion of said box to bear upon said pane in alinement with one of the ledges, thus holding the pane against accidental movement, said partition also bearing upon the indicating legend, thus holding the same in a set position, said partition having an end closure projecting at right angles thereto and engaging the front wall of said box at a point between said glazed openings, and a lamp for constantly illuminating the remaining glazed opening for forming a tail light, while said partition reflector will reflect the rays of the last mentioned lamp downwardly through said glass pane to be projected onto a license plate which may be carried thereadjacent.

4. An indicator for an automobile having brackets for supporting a license plate and including a pair of glazed openings, a lamp for constantly illuminating one of the openings for constituting a tail light, a normally extinguished lamp behind the other of the glazed openings, a danger indicating legend on the last named glazed opening, and a partition reflector for concentrating the light of the normally extinguished lamp upon the legend and reflecting the light of the constantly burning lamp upon the license plate.

5. An indicator for an automobile including separate illuminating means, a constantly illuminated window and an intermittently illuminated window and an insertible partition reflector for separating the rays of light from the different illuminating means.

6. An indicator for an automobile comprising a signal box having a pair of openings, said box also having an opening in one side thereof, a danger indicating legend on one of said glazed openings, a normally extinguished lamp behind the danger indicating legend, a partition reflector for concentrating the light of the normally extinguished lamp upon the danger legend, one end of said partition being bent to form an end closure for engaging said box at a point intermediate said glazed openings, a lamp constantly illuminating the remaining glazed opening for forming a tail light, while said partition reflector will reflect rays of light from the last mentioned light through the side opening in said box.

7. An indicator for automobiles comprising a signal box having a pair of glazed openings, said box being provided with ledges formed on the lower portion, said box having a danger indicating legend on one of said glazed openings, a normally extinguished lamp carried by said box in the rear of said danger indicating legend, the lower portion of said box being open, a glass pane carried upon said ledges for closing the opening in the lower portion of said box, a partition reflector extending from the upper portion of said box to bear upon said pane in alinement with one of the ledges, thus holding the same against accidental movement, said partition also bearing upon the indicating legend, thus holding the same in set position, and a lamp for constantly illuminating the remaining glazed opening for forming a tail light, while said partition reflector will project the rays of light from said last mentioned lamp downwardly through said glass pane to be reflected onto a license plate which may be carried thereadjacent.

In testimony whereof I affix my signature in presence of two witnesses.

Mr. LLOYD B. GRUMAN.

Witnesses:
M. E. Jones,
M. A. O'Connor.